US009449211B2

(12) United States Patent
Detwiler (10) Patent No.: US 9,449,211 B2
(45) Date of Patent: Sep. 20, 2016

(54) SCANNER WITH ADJUSTABLE FIELD OF VIEW

(71) Applicant: NCR Corporation, Duluth, GA (US)

(72) Inventor: Paul Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/552,642

(22) Filed: Nov. 25, 2014

(65) Prior Publication Data

US 2016/0148030 A1 May 26, 2016

(51) Int. Cl.
*G06K 7/14* (2006.01)
*G06Q 20/20* (2012.01)
*G06K 7/10* (2006.01)

(52) U.S. Cl.
CPC .......... *G06K 7/1465* (2013.01); *G06K 7/1439* (2013.01); *G06Q 20/208* (2013.01); *G06K 2007/10504* (2013.01); *G06K 2007/10524* (2013.01)

(58) Field of Classification Search
CPC ............ G06K 7/1465; G06K 7/1439; G06K 2007/10524; G06K 2007/10504; G06Q 20/208

See application file for complete search history.

(56) References Cited

U.S. PATENT DOCUMENTS

2010/0073460 A1* 3/2010 Gibbs ................... H04N 5/2259 348/36
2014/0306009 A1* 10/2014 LaLinde .............. G07G 1/0018 235/440

* cited by examiner

*Primary Examiner* — Kristy A Haupt
(74) *Attorney, Agent, or Firm* — Schwegman, Lundberg & Woessner (57) ABSTRACT

A scanner having a single integrated camera and a mechanism to adjustable alter the field of view of the camera to provide a field of view coverage area equivalent to scanners having two or more integrated cameras.

20 Claims, 10 Drawing Sheets

SCANNER WITH ADJUSTABLE FIELD OF VIEW

BACKGROUND

Point-Of-Sale (POS) devices often include a variety of integrated devices, such as scanners, scales, integrated scanners with scales, card readers with on-screen signature capabilities, and the like.

Some scanners come equipped with both a laser and a camera. This permits a cashier or customer to scan a barcode from two different directions. Generally, the laser operates to detect a bar code that is moved across its line of sight, which is flush with the checkout counter. The camera operates to detect a bar code that is facing the camera and away from the laser. These composite scanners have a variety of buttons and options that the cashier or a service engineer can access for purposes of configuring the scanners and/or adjusting settings on the scanners. This is a cumbersome process and requires the cashier to know what buttons to press on the scanner and in what order or sequence to achieve a desired setting. In addition, POS devices with both a laser and a scanner are more expensive.

In fact, imaging scanners have advantages over laser scanners in that they can read two-dimensional (2D) symbols and are actually better at detecting some poor quality one-dimensional (1D) tags. However, to date imaging scanners are still relatively expensive when compared to laser scanners. This is largely due to the fact that scanners with cameras require multiple cameras (more than one) in order to view multiple sides of an object being scanned, which is a requirement for bioptic scanning.

Therefore, there is a need to improve scanners equipped with multiple cameras or scanners that include both a laser and one or more cameras.

SUMMARY

In various embodiments, scanners and methods of operating those scanners to achieve adjustable fields of view with a single camera are provided.

According to an embodiment, a method for adjusting a scanner to achieve multiple fields of view with a single camera is provided.

Specifically, a mirror is intermittingly stopped and a direction that a lens of a camera is pointed at is reflected to a field of view produced by reflection off the mirror. Finally, the camera is activated to take an image of an object present in the field of view.

DETAILED DESCRIPTION

Figure 1A:
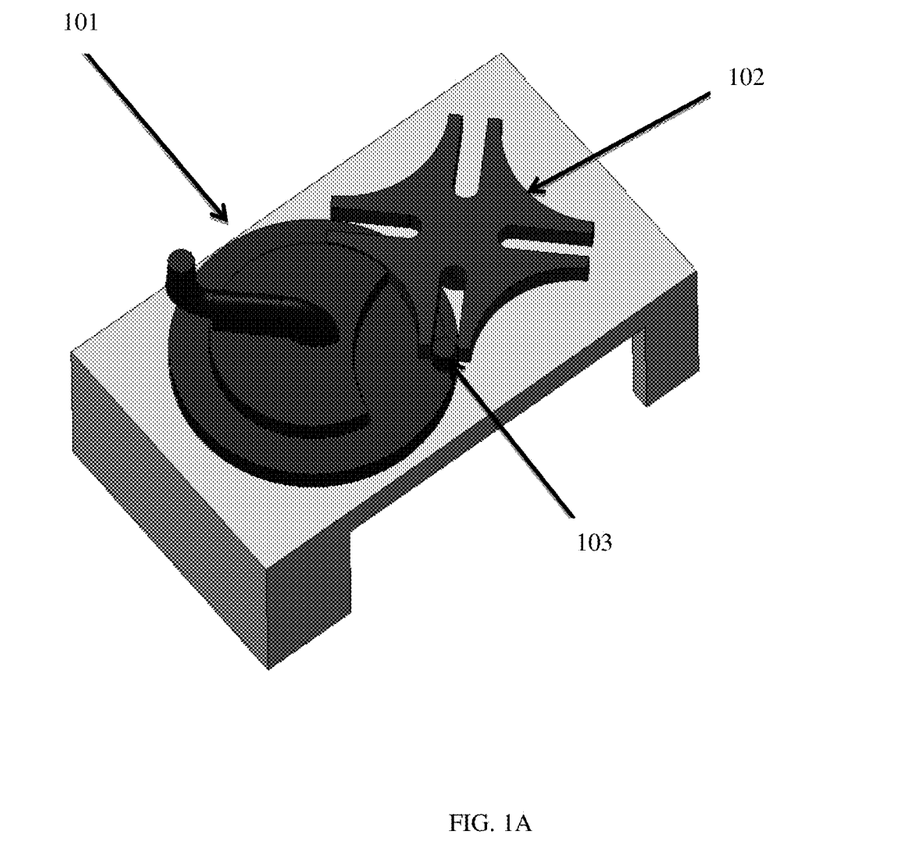
FIG. 1A is a diagram illustrating a Geneva drive configuration for permitting adjustment of a scanner to achieve multiple fields of view when integrated with a single camera, according to an example embodiment.

FIG. 1A is a diagram illustrating a Geneva drive configuration for permitting adjustment of a scanner to achieve multiple fields of view when integrated with a single camera, according to an example embodiment. It is to be noted that the configuration is shown schematically in greatly simplified form, with only those components relevant to understanding of this embodiment being illustrated.

The Geneva drive includes a motor (not shown) that provides a constant rotary motion being applied to a drive wheel 101. The drive wheel continuously rotates in a counter-clockwise or clockwise direction. There is a raised surface of the drive wheel 101 designed to engage an indexed wheel 102 intermittently. This means that the indexed wheel 102 remains in a fixed position for some period of time, which can be configured based on a variety of factors, such as speed of rotations of the drive wheel 101 and/or diameter size of the drive wheel 101.

The index wheel 102 produces intermittent rotary motion based on engagement of a pin 103 that engages a slot on the indexed wheel 102. The indexed wheel 102 (as shown in the FIG. 1A) includes four indexed slots, such that as the drive wheel 101 continuously rotates, the indexed wheel 102 will momentarily stop and become stationary at multiple times during its intermediate motion to complete a single rotation of the indexed wheel 102.

During a rotation of the drive wheel 101 a pin 103 engages a slot on the index wheel 102 which pushes the index when 102 to a position that exposes a next slot in the drive wheel 101 to be engaged by a next pin 103 during rotation of the drive wheel 101. When there is no pin 103 engagement with a slot of the index wheel 102, the index wheel is stationary.

The intermittent motion of the indexed wheel 102 when combined with the constant motion of the Geneva drive configuration as shown in the FIG. 1A permits one or more mirrors or mirror configurations to be affixed and coupled to the indexed wheel 102 to permit switching and adjusting the field of view of a stationary camera through reflection off the one or more mirrors. This permits a scanner having a single camera to achieve adjustable or switching fields of view to achieve image coverage areas equivalent to scanners equipped with two, three, or even four cameras.

Figure 1B:
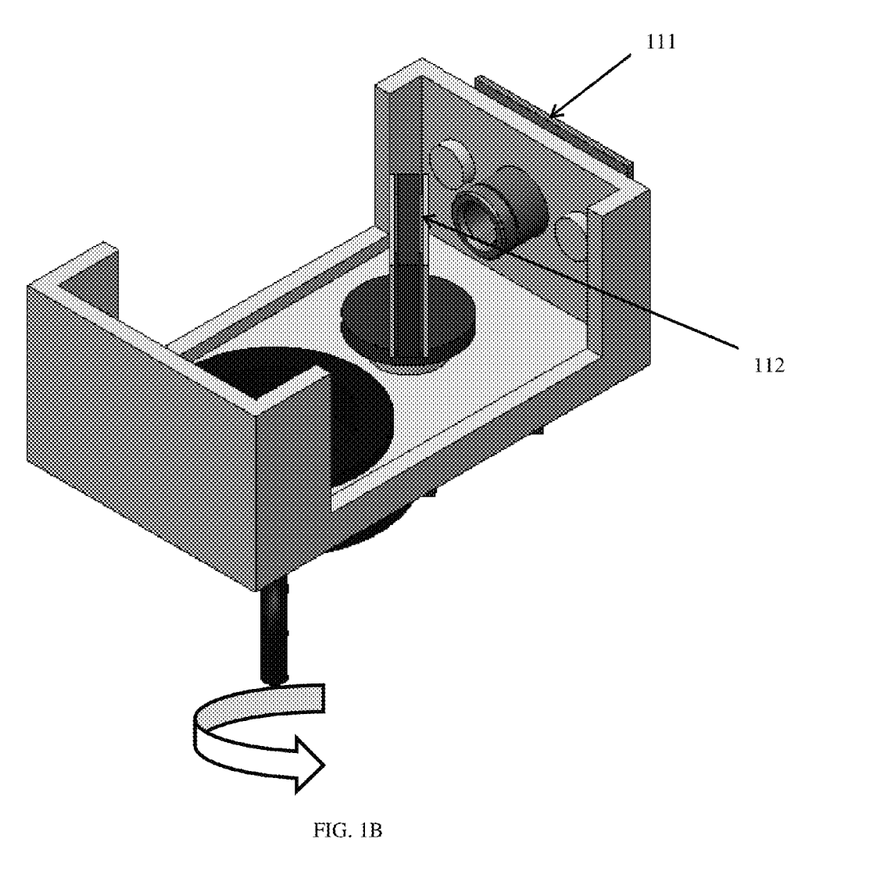
FIG. 1B is a diagram illustrating a scanner with a single camera that can adjust and switch fields of view of the scanner, according to an example embodiment.

FIG. 1B is a diagram illustrating a scanner with a single camera that can adjust and switch fields of view of the scanner, according to an example embodiment.

The scanner includes a camera 111 that is facing from one side of a base structure. The lens of the camera 111 is fixedly pointed at a mirror 112. The mirror is affixed to the index wheel 102 (the top surface shown as the smaller circular wheel to the lens of the camera 111 in the FIG. 1B) of the Geneva drive located at the underside of the base structure. The larger black wheel present in the FIG. 1B is the drive wheel 101, which rotates circularly in a counterclockwise motion. The mirror 112 reflects the field of view of the lens of the camera 111 to an open side of the base structure (two open sides in the FIG. 1B) this permits the camera 111 to capture images on either side of the base structure (the open sides of the base structure can include glass or other see-through material during deployment in a retail environment). Essentially, the camera 111 achieves multiple fields of view for each side within a 180 degree range through use of the mirror 112 producing reflection at intermittent intervals at times when one or more pins 103 of the drive wheel 101 are not engaged with the slots in the index wheel 102 to which the mirror 112 is coupled or affixed (the mirror 112 is perpendicularly affixed to the horizontal surface of the index wheel in the FIG. 1B; it is noted other configurations can exist as well).

In an embodiment, the camera 111 takes multiple images (two, three, four, or more images) of the object in the fields of view. The object can include, a good (such as a retail product, produce), identification card (such as a driver's license, government issued card), a credit card, a check, and the like.

Figure 1C:
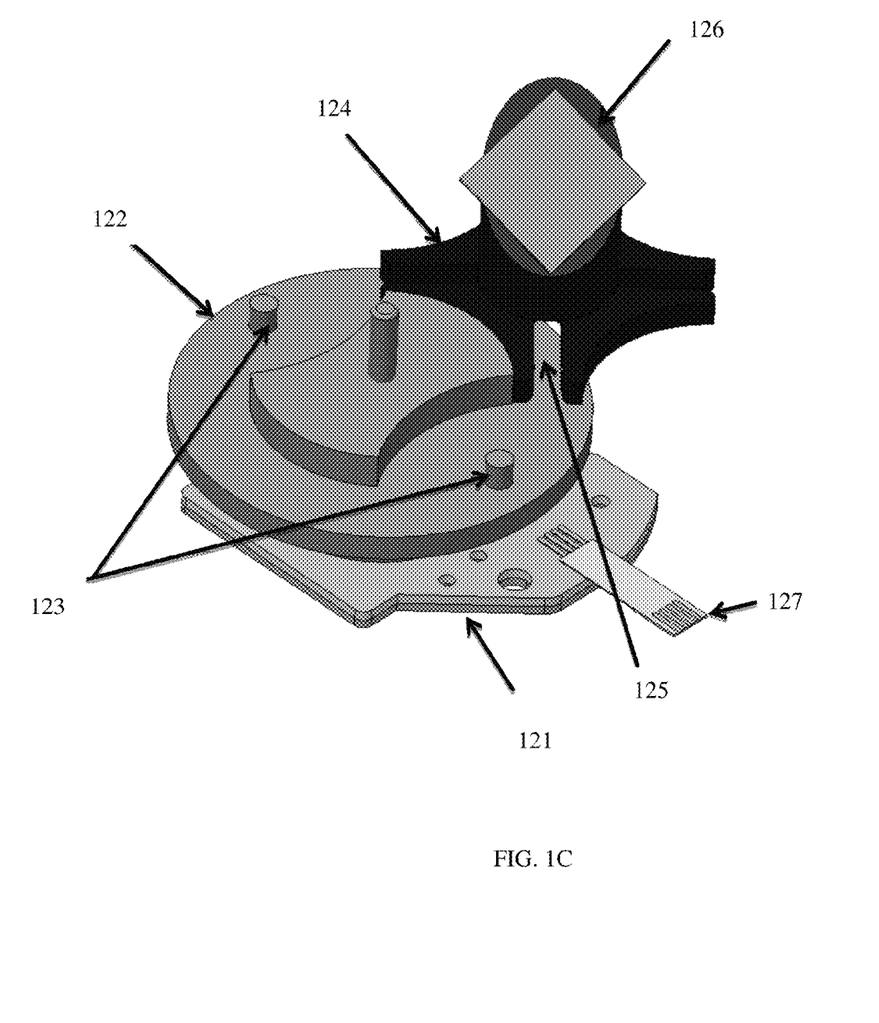
FIG. 1C is a diagram illustrating another Geneva drive configuration that can adjust and switch fields of view of a scanner, according to an example embodiment.

FIG. 1C is a diagram illustrating another Geneva drive configuration that can adjust and switch fields of view of a scanner, according to an example embodiment.

FIG. 1C illustrates another configuration of the Geneva drive with a single primary mirror oriented in position on the index wheel that may be 90 degrees or less (if mirror 126 is angled backward or forward relative to a vertical axis).

Again, the Geneva drive includes a motor 121 a drive wheel 122, two pins 123, and an index wheel 124. The index wheel 124 includes four slots 125 to engage pins 123 and start the index wheel's intermittent motion when the index wheel 120 is stationary (no pin 123 and slot 125 engagement).

A direct-current motor 121 spins the drive wheel 122 at a constant velocity. This is constant motion is converted at the drive wheel 122 into indexed motion for index wheel 124 through pins 123 engaging slots 125 being intermittently engaged and disengaged from the index wheel 124 during rotations of the drive wheel 122.

For example, with the arrangement shown in the FIG. 1C (two pins 123 and 4 slots 125) having an input speed of 1,200 rotations-per minute (rpm) causes the wheel 124 to index through a 90 degree angle 40 times per second.

Again, when the pins 123 and slots 125 are not engaged, in index wheel is stationary.

Furthermore, the mirror 126 is affixed or coupled to the index wheel 124.

The Geneva drive in the FIG. 1C also shows an interface port or slot 127.

Figure 1D:
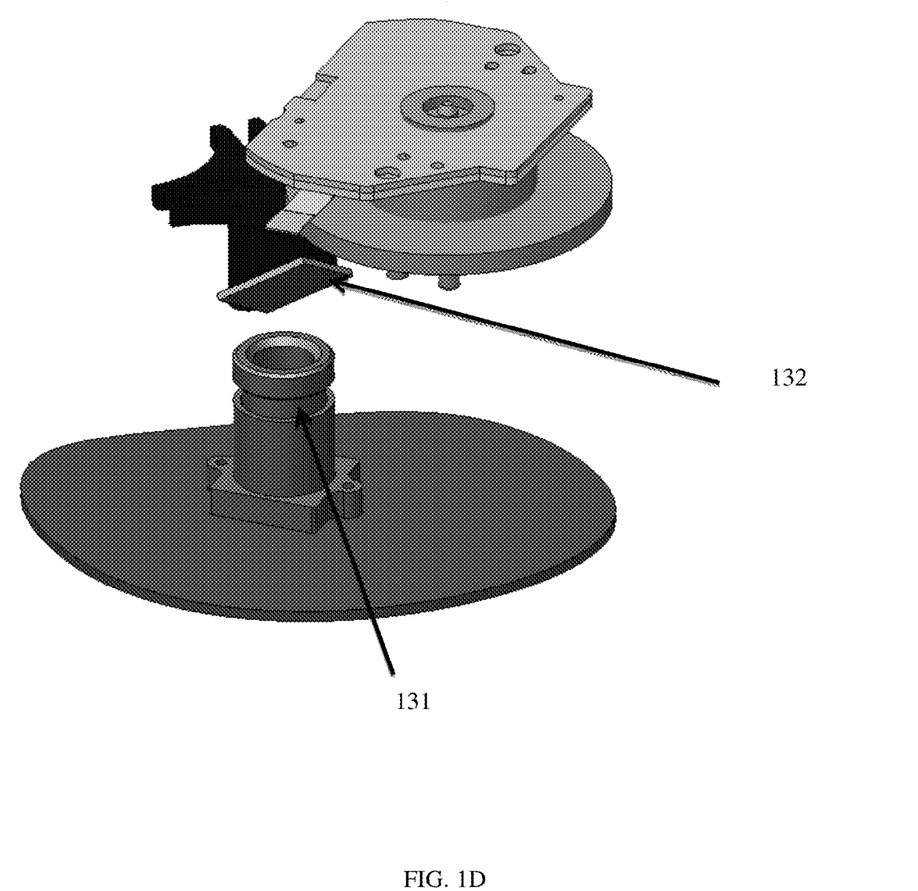
FIG. 1D is a diagram illustrating a configuration of a scanner with a single camera and the Geneva drive configuration of the FIG. 1C, according to an example embodiment.

FIG. 1D is a diagram illustrating a configuration of a scanner with a single camera and the Geneva drive configuration of the FIG. 1C, according to an example embodiment.

Here, the scanner includes a single camera 131 that looks vertical up at a primary mirror 132. Again, the mirror 132 affixed to an index wheel of a Geneva drive as discussed at length above.

The camera 131 field of view is reflected through a 90 degree angle by the mirror 132.

It is noted that the field of view or direction that the camera 131 is looking or capturing at any point in time is determined by the angle of the indexed wheel.

While the index wheel is stationary (no pin engagement), a camera sensor for the camera 131 is exposed. The index wheel moves to the next position, and the camera 131 is exposed again, and so on.

Figure 1E:
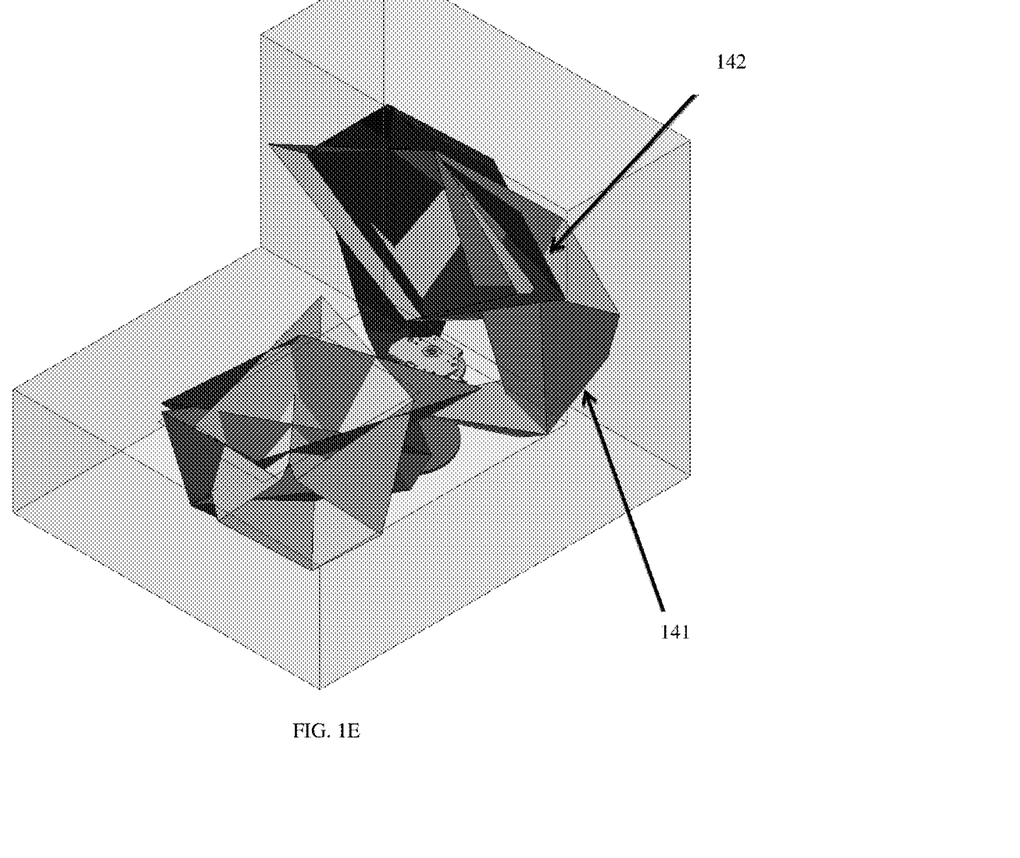
FIG. 1E is a diagram illustrating a variety of adjustable fields of view for a scanner having a single camera, according to an example embodiment.

FIG. 1E is a diagram illustrating a variety of adjustable fields of view for a scanner having a single camera, according to an example embodiment.

While the index wheel is stationary, the primary mirror reflects the field of view onto a stationary downstream set of mirrors 141 and 142. In turn, these mirrors 141 and 142 reflect the field of view to emit through a vertical or horizontal aperture and onto an object in a scan zone of the scanner.

Although not shown in the FIG. 1E, the downstream mirrors can include splitting mirrors to divide the fields of view of the single camera.

So, the indexing and intermittently moving mirror can reflect to a plurality of configured other sets of mirrors and/or splitting mirrors to further configure the adjustable fields of view of the single camera scanner.

Figure 1F:
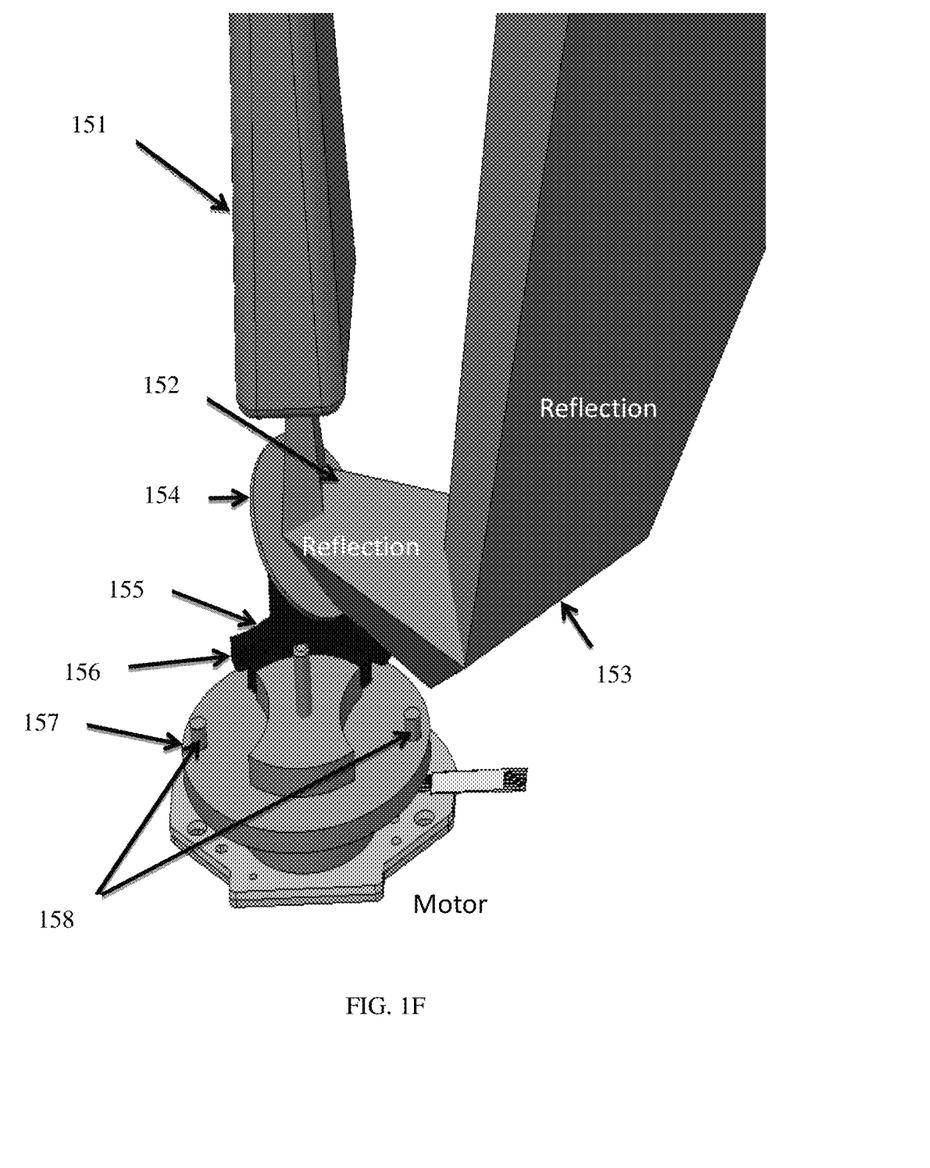
FIG. 1F is a diagram illustrating an apparatus for a handled scanner to be docked to achieve adjustable fields of view, according to an example embodiment.

FIG. 1F is a diagram illustrating an apparatus for a handled scanner to be docked to achieve adjustable fields of view, according to an example embodiment.

That is, many retailers may only possess a handheld scanner device, such as smaller stores (gas stations, convenience stores, and the like). When customers buy a significant amount of items, using the handheld scanner can be cumbersome and time consuming and particularly frustrating to other customers waiting in line. Moreover, the cashier may miss items if he/she is manually trying to figure out on the checkout counter what was scanned and what was not scanned. The FIGS. 1F and 1G present a novel scanner apparatus that is can be easily deployed and portable to achieve the benefits of the scanners discussed above with the FIGS. 1A-1E.

Specifically, the FIG. 1F shows a scanner 151 affixed, and optionally, removable, from an index wheel 155 of a Geneva drive. This creates a larger field of view 152 using the reflection by using a secondary mirror plane 153 and the primary mirror 154 affixed to the index wheel 155. Again, the index wheel 155 includes slots 156, a drive wheel 157, pins 158, and a motor.

Figure 1G:
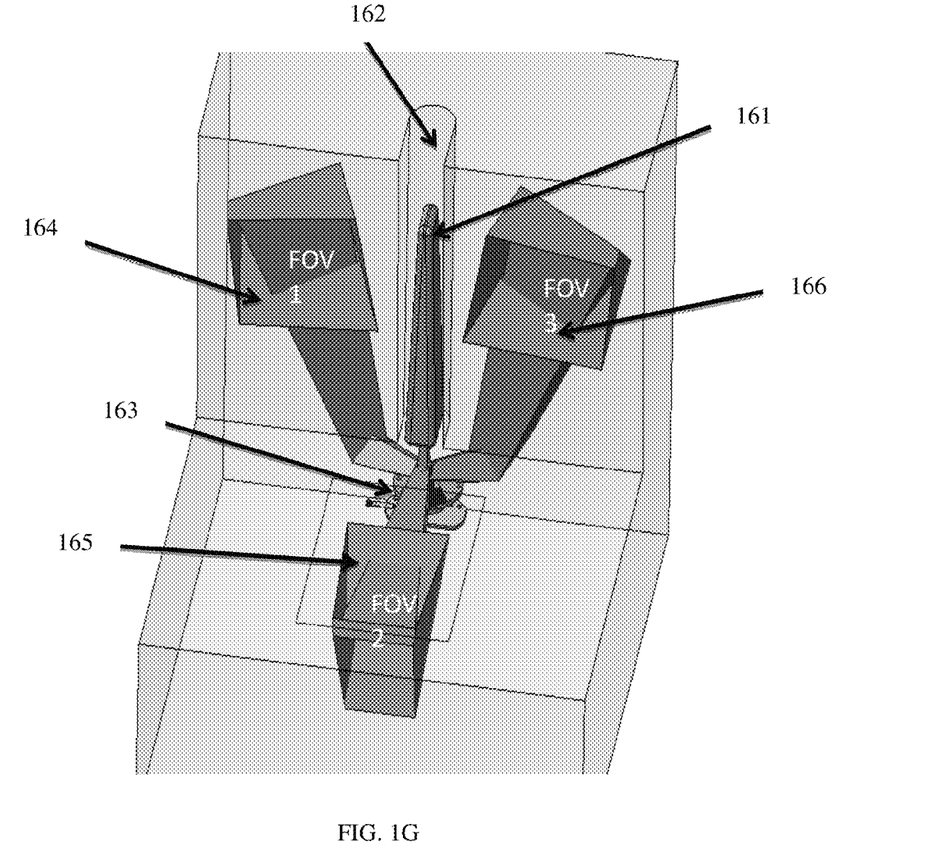
FIG. 1G is a diagram illustrating another apparatus for docking a handled scanner to achieve adjustable fields of view, according to an example embodiment.

FIG. 1G is a diagram illustrating another apparatus for docking a handled scanner to achieve adjustable fields of view, according to an example embodiment.

The FIG. 1G shows another configuration for using a handheld scanner to gain the benefits in the expandable and adjustable fields of view for a single camera scanner.

In the FIG. 1G the handheld scanner 161 is docked in recess 162 of the apparatus shown in the FIG. 1G. This configuration is for a bioptic scanner.

Mirrors for reflection are mounted on the index wheel 163. Some mirrors may be stationary as well as discussed above with the configuration of the FIG. 1E. This creates three-additional fields of views for the handled scanner 161 when docked in the apparatus. The fields of view (FOV in the FIG. 1E) include 164, 165, and 166.

These and other embodiments are now discussed with reference to the FIGS. 2-4.

Figure 2:
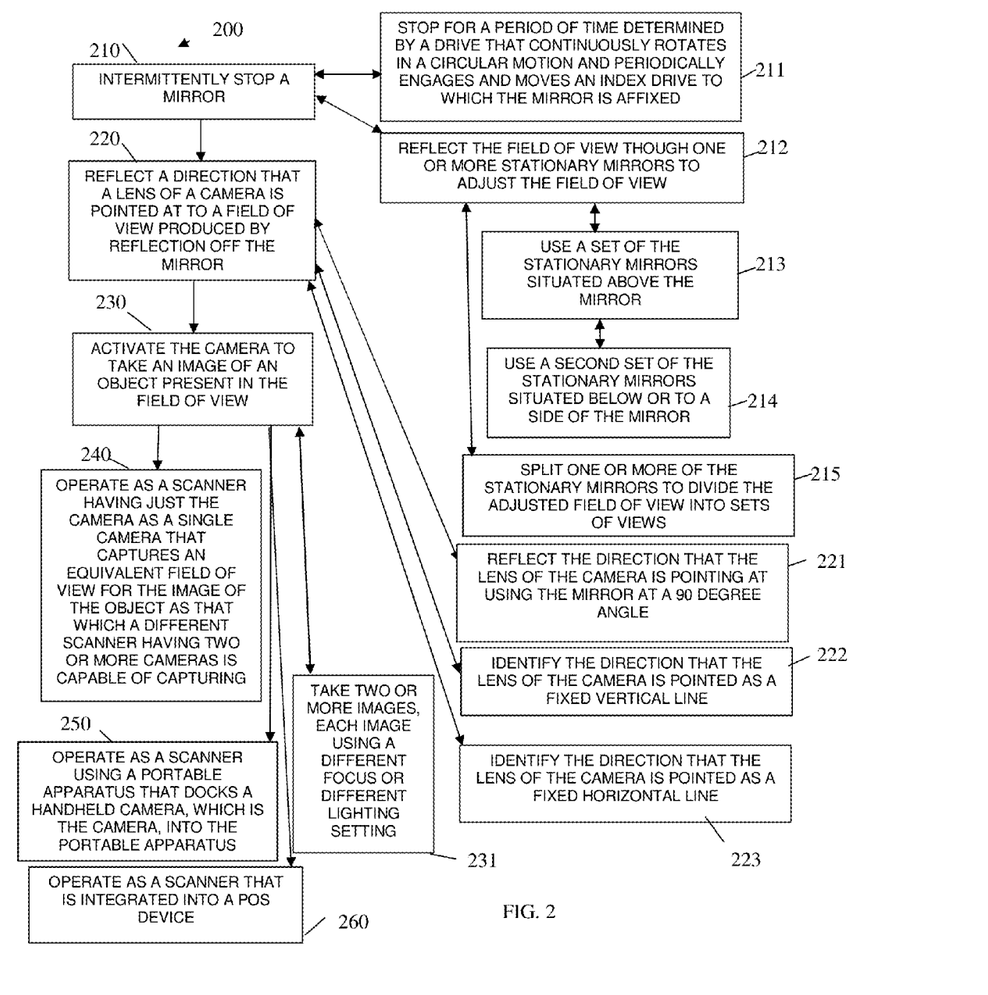
FIG. 2 is a diagram of a method for adjusting a scanner to achieve multiple fields of view with a single camera, according to an example embodiment.

FIG. 2 is a diagram of a method 200 for adjusting a scanner to achieve multiple fields of view with a single camera, according to an example embodiment. Some portions of the method 200 may be implemented as software module(s). The method is herein referred to as the "field of view adjuster." Any software portions of the field of view adjuster is implemented as executable instructions programmed and residing within memory and/or a non-transitory computer-readable (processor-readable) storage medium and executed by one or more processors of a device associated with a scanner. The processor(s) of the device that executes any software modules of the field of view adjuster are specifically configured and programmed to process those software portions of the field of view adjuster. Any software portions associated with the field of view adjuster may, but does not have to have, access to a network during its processing. The network can be wired, wireless, or a combination of wired and wireless.

In an embodiment, the scanner is the scanner of the FIG. 1B.

In an embodiment, the scanner is the scanner of the FIG. 1D.

In an embodiment, the scanner is the scanner of the FIG. 1F.

In an embodiment, the scanner is the scanner of the FIG. 1G.

In an embodiment, the field of view adjuster uses a configuration for the scanner that includes the configuration of the FIG. 1A.

In an embodiment, the field of view adjuster uses a configuration for the scanner that includes the configuration of the FIG. 1C.

In an embodiment, the field of view adjuster uses a configuration for the scanner that includes the configuration of the FIG. 1E.

At 210, the field of view adjuster intermittently stops a mirror. This can be done in a number of ways, some of which were discussed above with respect to the various configurations and uses of a Geneva drive and an affixed mirror. It is noted that the mirror also intermittently moves as discussed above with the FIGS. 1A-1G.

According to an embodiment, at 211, the field of view adjuster stops for a period of time determined by a drive that continuously rotates in a circular motion and periodically engages and moves an index drive to which the mirror is affixed. This was described in detail above with the FIGS. 1A-1G.

In an embodiment, at 212, the field of view adjuster reflects the field of view though one or more stationary mirrors to adjust the field of view; this is achieved through the stopped mirror.

In an embodiment of 212 and at 213, the field of view adjuster uses a set of stationary mirrors situated above the mirror.

In an embodiment of 213 and at 214, the field of view adjuster uses a second set of stationary mirrors situated below or to a side of the mirror.

In an embodiment, the configuration used to achieve 212-214 are shown in the FIG. 1G.

In an embodiment, at 215, the field of view adjuster splits one or more of the stationary mirrors to divide the adjusted field of view into sets of views.

At 220, the field of view adjuster reflects a direction that a lens of a camera is pointed at to a field of view produced by reflection off the mirror.

In an embodiment, at 221, the field of view adjuster reflects the direction that the lens of the camera is pointing at using the mirror at a 90 degree angle sets of views According to an embodiment, at 222, the field of view adjuster identifies the direction that the lens of the camera is pointed as a fixed vertical line (lens pointing up perpendicular to the ground or lens pointing down perpendicular to the ground).

According to an embodiment, at 223, the field of view adjuster identifiers the direction that the lens of the camera is pointed as a fixed horizontal line (lens pointing in a direction that is parallel to the ground).

At 230, the field of view adjuster activates the camera to take an image of an object present in the field of view this can be done via a sensor when the object comes into view within the field of view.

According to an embodiment, at 231, the field of view adjuster activates the camera two or more times to take two or more images of the object when present in the field of view. Each image taken uses a different focus and/or lighting setting.

In an embodiment, at 240, the field of view adjuster is operated as a scanner having just the camera as a single camera that captures an equivalent field of view for the image of the object as that which a different scanner having two or more cameras is capable of capturing.

In an embodiment, at 250, the field of view adjuster is operated as a scanner using a portable apparatus that docks a handheld camera, which is the camera, into the portable apparatus.

According to an embodiment, at 260, the field of view adjuster is operated as a scanner that is integrated into a POS device.

Figure 3:
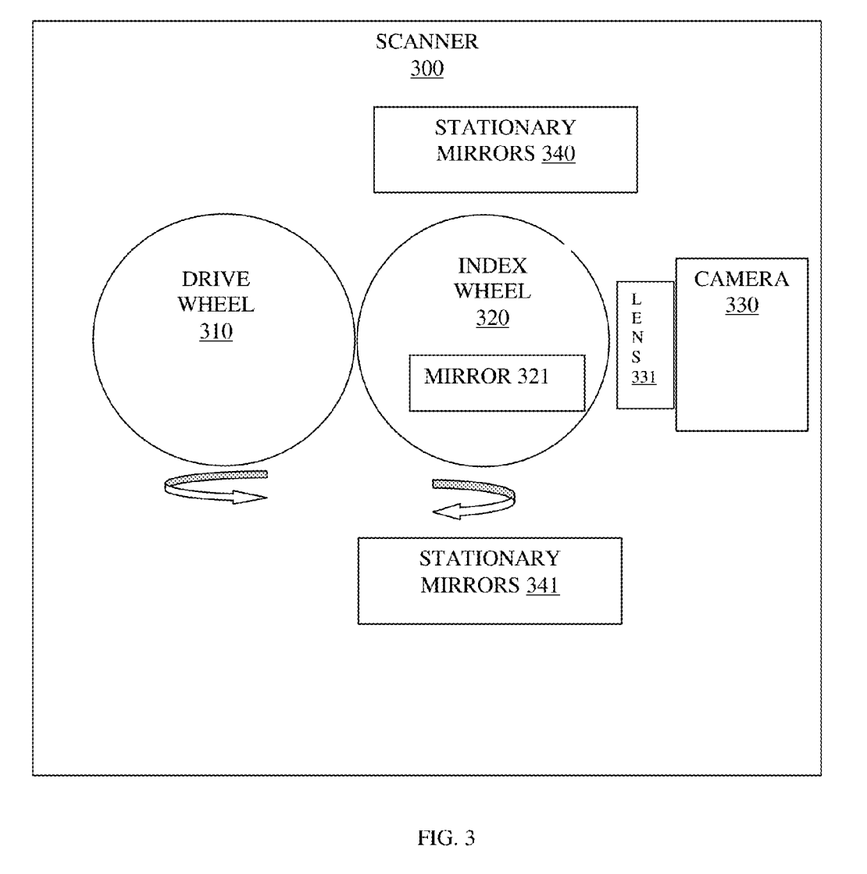
FIG. 3 is a diagram of a scanner with single camera, according to an example embodiment.

FIG. 3 is a diagram of a scanner 300 with single camera, according to an example embodiment. The scanner 300 includes one or more software module(s) and hardware modules. The software modules are implemented as executable instructions programmed and residing within memory and/or a non-transitory computer-readable (processor-readable) storage medium and executed by one or more processors associated with the scanner 300. The scanner 300 may or may not have access to one or more networks; any such network may be wired, wireless, or a combination of wired and wireless.

In an embodiment, the scanner 300 is the scanner of the FIG. 1B.

In an embodiment, the scanner 300 is the scanner of the FIG. 1D.

In an embodiment, the scanner 300 is the scanner discussed above with the FIG. 2.

In an embodiment, the scanner 300 includes a configuration of the FIG. 1A.

In an embodiment, the scanner 300 includes a configuration of the FIG. 1C.

In an embodiment, scanner 300 includes a configuration of the FIG. 1E.

The scanner 300 includes a drive wheel 310, an index wheel 320, a mirror 321 affixed to the index wheel 320, and a single camera 230. In an embodiment, the scanner 300 also includes one or more stationary mirrors 340 and 341.

The drive wheel 310 is configured to continuously rotate and intermittently engage the index wheel 321 to move the index wheel 321 from a stopped position to a moving position. The single camera 330 is configured to activate to take an image in a field of view of a lens 331 of the camera 330 when the index wheel 321 is in the stopped position. The field of view is a reflection off the mirror 321 in a direction that is different from where the lens 331 of the camera 320 is fixedly pointed at.

According to an embodiment, the reflection is multiple reflections off or one or more stationary mirrors 340 and/or 341 caused by an initial reflection of the mirror 321.

In an embodiment of the latter embodiment, the multiple reflections include at least one set of the stationary mirrors 340 situated above the mirror 321.

In an embodiment of the last embodiment, the multiple reflections include at least one additional set of the stationary mirrors 341 situated to a side or below the mirror 321.

According to an embodiment, the reflection occurs at a 90 degree angle off the mirror 321 to establish the field of view.

Figure 4:
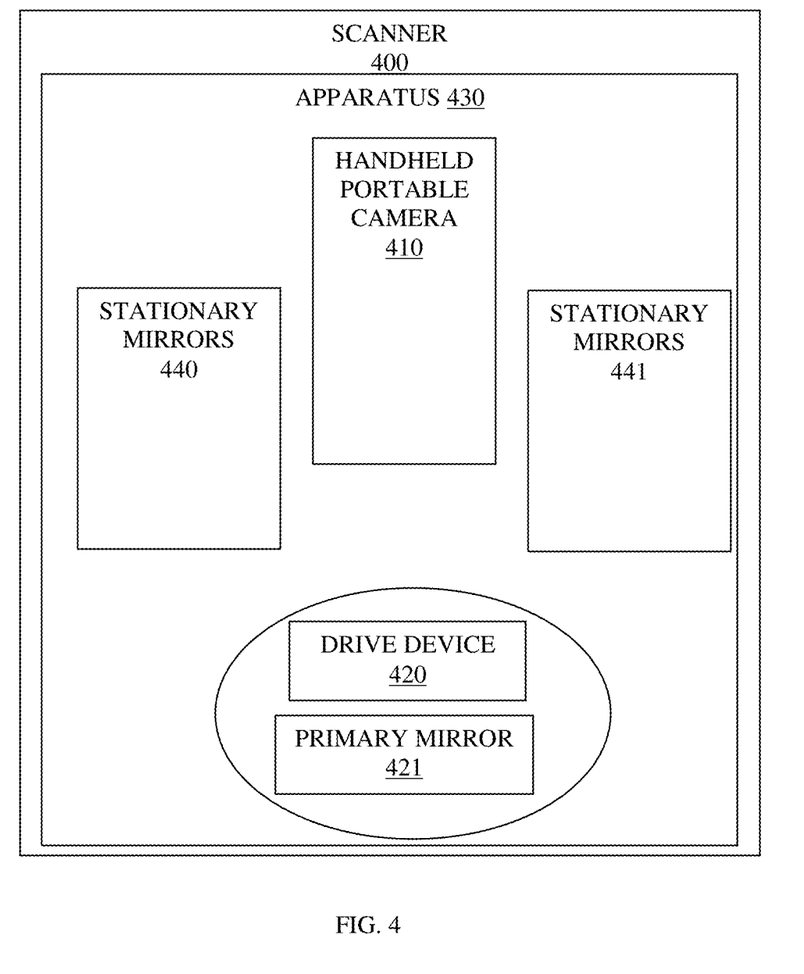
FIG. 4 is a diagram of another scanner with a single camera, according to an example embodiment.

FIG. 4 is a diagram of another scanner 400, according to an example embodiment. Some components of the scanner 400 are programmed and reside within memory and/or a non-transitory computer-readable medium and execute on one or more processors of the scanner 400. The scanner 400 may or may not communicate over one or more networks, which can be wired, wireless, or a combination of wired and wireless.

In an embodiment, the scanner 400 is the scanner of the FIG. 1F.

In an embodiment, the scanner 400 is the scanner of the FIG. 1G.

In an embodiment, the scanner 400 is the scanner discussed with the FIG. 2.

In an embodiment, the scanner 400 includes a configuration as shown in the FIG. 1A.

In an embodiment, the scanner 400 includes a configuration as shown in the FIG. 1C.

In an embodiment, the scanner 400 includes a configuration as shown in the FIG. 1E.

The scanner 400 includes a handheld portable camera 410, a drive device 420 having an affixed primary mirror 421, and an apparatus 430. In an embodiment, the scanner 400 includes one or more stationary mirrors 440 and 441.

The apparatus 430 is adapted to receive the handheld portable camera 410 as a docked camera with a lens of the camera pointed in a fixed direction within the apparatus 430. The drive device 420 is integrated into the apparatus 430 an includes an affixed primary mirror 421 that the drive device 420 is configured to intermittently stop in front of and move from in front of the fixed direction of the lens. The mirror 421 when in front of the fixed direction of the lens is configured to expand a field of view of camera 410 in proximity to the apparatus 430 by reflection, and the camera 410 is configured to capture an image of an object while in the field of view.

In an embodiment, the object is a good, an identification card, a credit/gift card, a check, and the like.

According to an embodiment, the apparatus 430 further includes one or more sets of stationary mirrors 440 and/or 441 that provide further reflection from the mirror 421 to further expand or change the field of view.

In an embodiment, the camera 410 is one of: a handled wand scanner interfaced to a POS device, integrated into a phone and wirelessly in communication with the POS device, integrated into a tablet and wirelessly in communication with the POS device.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   intermittently stopping a mirror by a drive continuously rotating and intermittently engaging an index wheel;
   reflecting a direction that a lens of a camera is pointed at to a field of view produced by reflection off the mirror; and
   activating the camera to take an image of an object present in the field of view.

2. The method of claim 1, wherein intermittently stopping further includes stopping for a period of time determined by the drive that continuously rotates in a circular motion and periodically engages and moves the index drive to which the mirror is affixed.

3. The method of claim 1, wherein reflecting further includes further reflecting the field of view though one or more stationary mirrors to adjust the field of view.

4. The method of claim 3, wherein further reflecting further includes using a set of the stationary mirrors situated above the mirror.

5. The method of claim 4, wherein using further includes using a second set of the stationary mirrors situated below or to a side of the mirror.

6. The method of claim 3, wherein further reflecting further includes splitting one or more of the stationary mirrors to divide the adjusted field of view into sets of views.

7. The method of claim 1, wherein reflecting further includes reflecting the direction that the lens of the camera is pointing at using the mirror at a 90 degree angle.

8. The method of claim 1, wherein reflecting further includes identifying the direction that the lens of the camera is pointed as a fixed vertical line.

9. The method of claim 1, wherein reflecting further includes identifying the direction that the lens of the camera is pointed as a fixed horizontal line.

10. The method of claim 1, where activating further includes activating the camera two or more times to take two or more additional images of the object present in the field of view, wherein each image is taken using at least one of: a different focus and a different lighting setting.

11. The method of claim 1 further comprising: operating the method as a scanner having just the camera as a single camera that captures an equivalent field of view for the image of the object as that which a different scanner having two or more cameras is capable of capturing.

12. The method of claim 1 further comprising, operating the method as one of: 1) a scanner using a portable apparatus that docks a handheld camera, which is the camera, into the portable apparatus and 2) a scanner that is integrated into a Point-Of-Sale (POS) device.

13. A scanner, comprising:
a drive wheel;
an index wheel;
a mirror affixed to the index wheel; and
a single camera;
wherein the drive wheel is configured to continuously rotate and intermittently engage the index wheel to move the index wheel from a stopped position to a moving position, and wherein the single camera is configured to activate to take an image in a field of view of a lens of the camera when the index wheel is in the stopped position and not engaged by the drive wheel, the field of view is a reflection off the mirror in a direction that is different from where the lens of the camera is fixedly pointed at.

14. The scanner of claim 13, wherein the reflection is multiple reflections off or one or more stationary mirrors caused by an initial reflection of the mirror.

15. The scanner of claim 14, wherein the multiple reflections include at least one set of the stationary mirrors situated above the mirror.

16. The scanner of claim 15, wherein the multiple reflections include at least one additional set of the stationary mirrors situated to a side or below the mirror.

17. The scanner of claim 11, wherein the reflection occurs at a 90degree angle off the mirror to establish the field of view.

18. A scanner, comprising:
a handled portable camera;
a drive device; and
an apparatus;
wherein the apparatus is adapted to receive the handheld portable camera as a docked camera with a lens of the camera pointed in a fixed direction within the apparatus, and wherein the drive device is integrated into the apparatus an includes an affixed primary mirror that the drive device is configured to intermittently stop in front of and move from in front of the fixed direction of the lens by the drive device disengaging an index wheel, and wherein the mirror when in front of the fixed direction of the lens is configured to expand a field of view of camera in proximity to the apparatus by reflection, and the camera is configured to capture an image of an object while in the field of view.

19. The scanner of claim 18, wherein the apparatus further includes one or more sets of stationary mirrors that provide further reflection from the mirror to further expand or change the field of view.

20. The scanner of claim 18, wherein the camera is one of: a handled wand scanner interfaced to a Point-Of-Sale (POS) device, integrated into a phone and wirelessly in communication with the POS device, integrated into a tablet and wirelessly in communication with the POS device.

* * * * *